United States Patent
Seo et al.

(10) Patent No.: US 10,044,211 B2
(45) Date of Patent: Aug. 7, 2018

(54) BATTERY PACK AND METHOD OF CONTROLLING THE SAME

(71) Applicant: Samsung SDI Co., Ltd., Yongin-si, Gyeonggi-do (KR)

(72) Inventors: Youngdong Seo, Yongin-si (KR); Gilchoun Yeom, Yongin-si (KR); Seotaek Oh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 94 days.

(21) Appl. No.: 15/008,311

(22) Filed: Jan. 27, 2016

(65) Prior Publication Data

US 2016/0226263 A1    Aug. 4, 2016

(30) Foreign Application Priority Data

Feb. 3, 2015    (KR) .................. 10-2015-0016900

(51) Int. Cl.
  *H02J 7/00*    (2006.01)
  *B60L 3/00*    (2006.01)
  (Continued)

(52) U.S. Cl.
  CPC ............ *H02J 7/007* (2013.01); *B60L 3/0046* (2013.01); *B60L 3/12* (2013.01); *B60L 11/1861* (2013.01);
  (Continued)

(58) Field of Classification Search
  CPC ... H02J 7/0016; H02J 7/0018; Y02T 10/7055; Y02E 60/12; H01M 10/441
  (Continued)

(56) References Cited

U.S. PATENT DOCUMENTS 7,507,500 B2    3/2009    Donnelly et al.
2005/0233205 A1*    10/2005    Koike .................. G06F 1/1616
                                                    429/90
(Continued)

FOREIGN PATENT DOCUMENTS

EP    2 495 802 A1    9/2012
KR    10-0680901 B1    2/2007
(Continued)

OTHER PUBLICATIONS

Extended European Search Report dated Jul. 1, 2016 for European Patent Application No. EP 16 153 610.7.
(Continued)

*Primary Examiner* — Arun Williams
(74) *Attorney, Agent, or Firm* — Knobbe Martens Olson & Bear LLP

(57) ABSTRACT

A battery pack and a method for controlling the same are disclosed. In one aspect, the battery pack includes a master battery management system (BMS) and a plurality of battery modules each including a slave BMS connected to the master BMS. In another aspect, the method includes first determining the number of slave BMS' electrically connected to the master BMS, receiving a plurality of voltage values of the battery modules from the slave BMS' and first calculating an average value of the voltage values. The method also includes second determining a terminal voltage of the battery pack, comparing the average voltage value with the terminal voltage of the battery pack to calculate the number of the battery modules connected in series, and third determining a first series connection relationship of the battery modules, in one of a plurality of serial unit sets, based on the comparison.

18 Claims, 4 Drawing Sheets

(51) Int. Cl.
  *B60L 3/12* (2006.01)
  *B60L 11/18* (2006.01)
  *H01M 2/10* (2006.01)
  *H01M 2/34* (2006.01)
  *H01M 10/48* (2006.01)

(52) U.S. Cl.
  CPC ....... *B60L 11/1866* (2013.01); *H01M 2/1016* (2013.01); *H01M 2/34* (2013.01); *H01M 10/482* (2013.01); *H02J 7/0021* (2013.01); *H02J 7/0024* (2013.01); *H02J 7/0036* (2013.01); *B60L 2240/545* (2013.01); *B60L 2240/547* (2013.01); *B60L 2240/549* (2013.01); *H02J 7/0004* (2013.01); *H02J 7/0014* (2013.01); *H02J 7/0031* (2013.01); *H02J 2007/0098* (2013.01); *Y02T 10/7005* (2013.01); *Y02T 10/7044* (2013.01); *Y02T 10/7061* (2013.01)

(58) Field of Classification Search
  USPC .......................................................... 320/118
  See application file for complete search history.

(56) References Cited

U.S. PATENT DOCUMENTS

| | | | |
|---|---|---|---|
| 2006/0226811 A1* | 10/2006 | Seo | H02J 7/0026 320/116 |
| 2007/0139006 A1 | 6/2007 | Yasuhito et al. | |
| 2008/0030169 A1* | 2/2008 | Kamishima | G01R 31/361 320/134 |
| 2010/0052615 A1* | 3/2010 | Loncarevic | H02J 7/0016 320/118 |
| 2010/0167110 A1* | 7/2010 | Johnson | B25F 5/00 429/91 |
| 2010/0261043 A1* | 10/2010 | Kim | H01M 10/4207 429/61 |
| 2011/0161024 A1 | 6/2011 | Sim et al. | |
| 2013/0113438 A1 | 5/2013 | Aradachi et al. | |

FOREIGN PATENT DOCUMENTS

| | | |
|---|---|---|
| KR | 10-2007-0064244 A | 6/2007 |
| KR | 10-2010-0097504 A | 9/2010 |
| KR | 10-2011-0074207 A | 6/2011 |
| KR | 10-2013-0033197 A | 4/2013 |
| KR | 10-1330395 B1 | 11/2013 |

OTHER PUBLICATIONS

Korean Registration Determination Certificate dated Jul. 1, 2016 for Korean Patent Application No. KR 10-2015-0016900.

Korean Office Action dated Jan. 16, 2016 for Korean Patent Application No. KR 10-2015-0016900.

European Examination Report dated Oct. 30, 2017 for European Patent Application No. EP 16 153 610.7, which shares priority of Korean Patent Application No. KR 10-2015-0016900.

* cited by examiner

BATTERY PACK AND METHOD OF CONTROLLING THE SAME

INCORPORATION BY REFERENCE TO ANY PRIORITY APPLICATIONS

This application claims priority to and the benefit of Korean Patent Application No. 10-2015-0016900, filed on Feb. 3, 2015, in the Korean Intellectual Property Office, the entire contents of which are incorporated herein by reference in their entirety.

BACKGROUND

Field

The described technology generally relates to a battery pack and a method of controlling the same.

Description of the Related Technology

Secondary batteries have favorable characteristics such as high energy density and are being applied to portable devices as well as electric vehicles (EVs), hybrid vehicles (HVs), and the like, which are driven by an electrical driving source.

Due to environmental and resource concerns, demand for a system that can store power and effectively utilize the stored power has increased. In turn, secondary batteries have emerged as a novel energy source as being environmentally friendly and enhancing energy efficiency, since less harmful byproducts are generated as well as the use of fossil fuel reduced.

A plurality of battery cells are generally connected in series and/or parallel to form a battery module, and a plurality of battery modules are connected in series and/or parallel to form a battery pack generally applied to electric vehicles. Each cell includes a positive electrode current collector, a separator, an active material, an electrolyte, and an aluminum thin film layer so that charging and discharging can be performed by an electrochemical reaction between the components.

Typically, the battery pack further includes a battery management system (BMS) for monitoring and controlling a state of the secondary batteries by applying an algorithm for controlling power supply with respect to a driving load such as a motor measuring electrical characteristics values, which can include a current or a voltage that controls charging and discharging, controlling voltage equalization, and estimating a state of charge (SOC).

A multi-module battery pack can have various forms according to the circuitry or printed circuit board (PCB) configurations. In order to enhance the battery pack's efficiency, a multi-slave structure including a plurality of BMS' including a master or main BMS controlling a plurality of slave BMS' is largely used.

In such a structure, in order to check the current battery state and utilize the same for controlling charging and discharging the batteries, the master BMS communicates with the slave BMS' to collect data regarding a plurality of batteries handled by the slave BMS'.

SUMMARY OF CERTAIN INVENTIVE ASPECTS

One inventive aspect relates to a method for controlling a battery pack including a slave battery management system (BMS) provided in each of a plurality of battery modules and a master battery management system (BMS) connected to the slave BMS'. The method includes the master BMS checking the number of slave BMS' connected to the master BMS, obtaining voltage values of battery modules from the slave BMS' and calculating an average voltage value Vn of the voltage values of the battery modules, obtaining a terminal voltage Vb of the battery pack, and comparing the average voltage value of the battery modules with the terminal voltage Vb of the battery pack to calculate the number N of battery modules connected in series among the battery modules to obtain a series connection relationship of the battery modules.

The method can further include, when the N number of battery modules connected in series is defined as one serial unit set, obtaining a parallel connection relationship of the battery modules by calculating the number M of the serial unit sets connected in parallel with reference to the number of slave BMS' connected to the master BMS' and number N of battery modules connected in series to the battery pack, after the comparing of the average voltage value of the battery modules with the terminal voltage Vb of the battery pack to calculate the number N of battery modules connected in series among the battery modules to obtain a series connection relationship of the battery modules.

The master BMS checking of the number of slave BMS' connected to the master BMS can further include obtaining information on series and parallel connection relationships of battery cells included in the battery modules from each of the slave BMS'.

The method can further include calculating series and parallel connection relationships of the entire battery cells included in the battery pack with reference to the series and parallel connection relationships of the battery modules and the series and parallel connection relationships of the battery cells included in the battery modules, after the obtaining of a parallel connection relationship of the battery modules by calculating the number M of the serial unit sets connected in parallel with reference to the number of slave BMS' connected to the master BMS' and number N of battery modules connected in series to the battery pack.

A protection operation corresponding to the series and parallel connection relationships of the entire battery cells included in the battery pack can be performed in the master BMS.

The method can further include the master BMS calculating capacity of the battery pack from the series and parallel connection relationships of the entire battery cells included in the battery pack.

The master BMS checking of the number of slave BMS' connected to the master BMS can further include, when the series and parallel connection relationship information of the battery cells included in each of the battery module are not identical, controlling a switch that controls a charge current flowing to the battery pack or a discharge current output from the battery pack to be turned off.

The obtaining of voltage values of battery modules from the slave BMS' and calculating an average voltage value Vn of the voltage values of the battery modules can include, when voltage values of the battery modules are not identical, comparing the voltage values of the battery modules to calculate a difference value, and when the difference value is determined to be equal to or greater than a predetermined value, controlling the switch that controls the charge current flowing to the battery pack or the discharge current output from the battery pack to be turned off.

The master BMS checking of the number of slave BMS' connected to the master BMS can further include obtaining state of health (SOH) values of the battery modules from each of the slave BMS' and, when the SOH values of the battery modules are not identical, controlling the switch that controls the charge current flowing to the battery pack or the discharge current output from the battery pack to be turned off.

The master BMS checking of the number of slave BMS' connected to the master BMS can further include obtaining the number of accumulated charge cycles of the battery modules from each of the slave BMS' and, when the number of accumulate charge cycles of the battery modules are not identical, controlling the switch that controls the charge current flowing to the battery pack or the discharge current output from the battery pack to be turned off.

Another aspect is a method for controlling a battery pack including a master battery management system (BMS) and a plurality of battery modules each including a slave BMS connected to the master BMS. The method comprises: first determining the number of slave BMS' electrically connected to the master BMS; receiving a plurality of voltage values of the battery modules from the slave BMS'; first calculating an average value of the voltage values; second determining a terminal voltage of the battery pack; comparing the average voltage value with the terminal voltage of the battery pack to calculate the number of the battery modules connected in series; and third determining a first series connection relationship of the battery modules, in one of a plurality of serial unit sets, based on the comparison.

In the above method, each serial unit set includes the battery modules connected in series, and wherein the method further comprises: after the third determining, second calculating the number of the serial unit sets electrically connected in parallel based on the number of slave BMS' electrically connected to the master BMS and the number of battery modules connected in series in the corresponding serial unit set so as to determine a first parallel connection relationship of the battery modules among the serial unit sets.

In the above method, the first determining includes receiving information on second series and second parallel connection relationships of battery cells included in the battery modules from each of the slave BMS'.

In the above method, the second calculating includes calculating third series and third parallel connection relationships of all of the battery cells included in the battery pack based on the first series and first parallel connection relationships and the second series and second parallel connection relationships.

The above method further comprises performing a protection operation, in the master BMS, based on the third series and third parallel connection relationships of all of the battery cells included in the battery pack.

The above method further comprises third calculating a power capacity of the battery pack from the third series and third parallel connection relationships.

In the above method, the first determining further includes controlling a switch to be turned off to disable a charge current flow to the battery pack or a discharge current output from the battery pack when information on the second series and second parallel connection relationship of the battery cells included in each of the battery module are not identical.

In the above method, the first calculating includes: fourth calculating a difference value between the voltage values when the voltage values of the battery modules are not identical to each other; and controlling the switch to be turned off to disable the charge current flow to the battery pack or the discharge current output from the battery pack when the difference value is determined to be substantially equal to or greater than a predetermined value.

In the above method, the first determining further includes: receiving a plurality of state of health (SOH) values of the battery modules from each of the slave BMS'; and controlling the switch to be turned off to disable the charge current flow to the battery pack or the discharge current output from the battery pack when the SOH values are not identical to each other.

In the above method, the first determining further includes: receiving a number of accumulated charge cycles of each of the battery modules from each of the slave BMS'; and controlling the switch to be turned off to disable the charge current flow to the battery pack or the discharge current output from the battery pack when the number of accumulate charge cycles are not identical to each other.

Another aspect is a battery pack, comprising: a master battery management system (BMS); and a plurality of battery modules electrically connected to the master BMS, wherein each battery module includes one or more battery cells and a slave BMS, wherein each slave BMS is electrically connected to the master BMS, and wherein the master BMS is configured to determine the number of slave BMS', receive a plurality of voltage values of the battery modules from the slave BMS', calculate an average value of the voltage values, determine a terminal voltage of the battery pack, compare the average voltage value with the terminal voltage to calculate the number of the battery modules electrically connected in series in one of a serial unit, and determine a first series connection relationship of the battery modules based on the comparison.

The above battery pack further comprises one or more serial unit sets each including two or more of the battery modules in the first series connection relationship, wherein the master BMS is further configured to calculate the number of the serial unit sets based on the number of slave BMS' electrically connected to the master BMS and the number of battery modules connected in series in the corresponding serial unit so as to determine a first parallel relationship of the battery modules among the serial unit sets.

In the above method, the master BMS is further configured to receive information on second series and second parallel connection relationships of the battery cells included in the battery modules from each of the slave BMS'.

In the above method, the master BMS is further configured to calculate third series and third parallel connection relationships of all of the battery cells included in the battery pack based on the first and second series and first and second parallel relationships.

In the above method, the master BMS is further configured to perform a protection operation based on the third series and third parallel connection relationships of all of the battery cells included in the battery pack.

The above battery pack further comprises a switch configured to be turned on or off via the master BMS so as to control current flow to the battery pack or discharge current output from the battery pack.

In the above method, the master BMS is further configured to turn off the switch so as to disable the current flow to the battery pack or the discharge current output from the battery pack when the information on the second series and second parallel connection relationship of the battery cells included in each of the battery module are not identical to each other.

In the above method, the master BMS is further configured to i) calculate a difference value between the voltage values when the voltage values of the battery modules are not substantially identical to each other and ii) turn off the switch so as to disable the current flow to the battery pack or the discharge current output from the battery pack when the difference value is substantially equal to or greater than a predetermined value.

In the above method, the master BMS is further configured to i) receive a plurality of state of health (SOH) values of the battery modules from each of the slave BMS' and ii) turn off the switch so as to disable the current flow to the battery pack or the discharge current output from the battery pack when the SOH values are not substantially identical to each other.

In the above method, each of the battery module includes one or more battery cells, and wherein each of the slave BMS' comprises: a state measurement unit configured to measure a state of the battery cells; a storage unit configured to store information of the battery cells; a communication unit configured to data communicate with the master BMS; and a charging/discharging control unit configured to control charging and discharging of the battery cells.

According to at least one of the disclosed embodiments, even though a connection state of a battery module is altered, designing a new control program fitted to an altered connection state is easier or unnecessary.

Also, even without designing a new control program, safety of a battery pack can be enhanced by controlling the battery pack in a charge and discharge mode fitted to an altered connection state.

Also, when battery modules different in at least any one among a voltage, a wear rate, and a charge state are connected, it can be detected to enhance safety of a battery.

DETAILED DESCRIPTION OF CERTAIN INVENTIVE EMBODIMENTS

Figure 1:
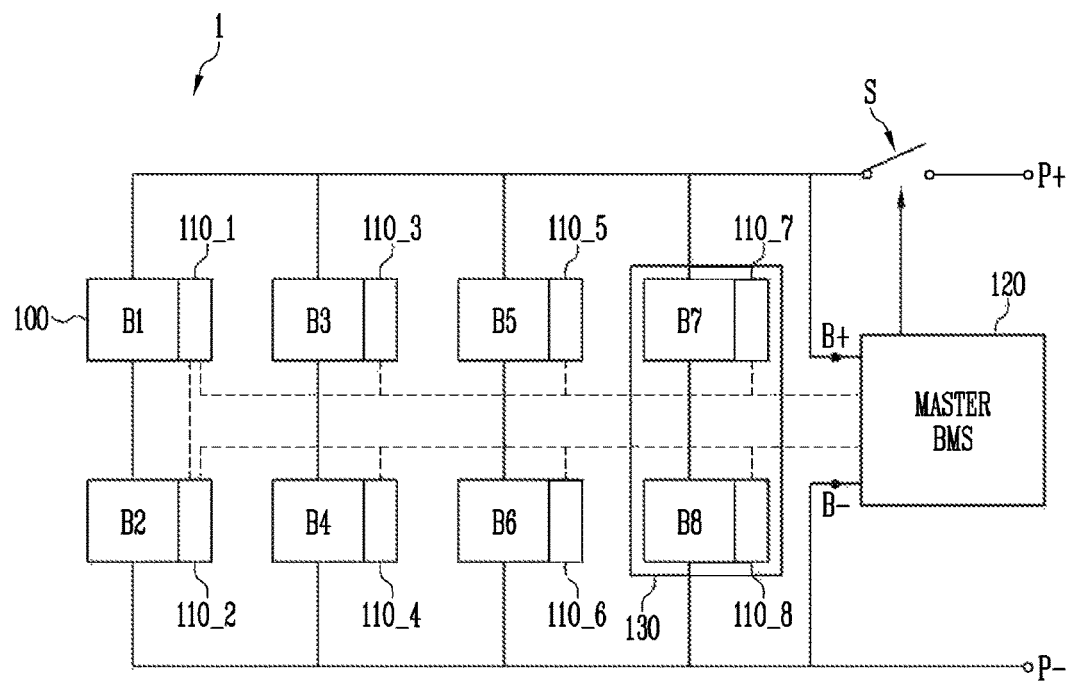
FIG. 1 is a block diagram illustrating a configuration of a battery pack according to an embodiment.

Embodiments of the described technology will be described in detail with reference to the accompanying drawings. These embodiments will be described sufficient for a person skilled in the art to embody the described technology. It should be appreciated that various embodiments may not be necessarily mutually exclusive. For example, particular shapes, structures, and characteristics in relation to one embodiment described herein can be implemented as a different embodiment without departing from the spirit and scope of the described technology. Thus, detailed descriptions hereinafter are not limitative and the scope of the described technology is intended to be embraced by the appended claims as well as all the equivalents of the claims. In the drawings, like reference numerals designate like elements throughout the specification.

Hereinafter, embodiments will be described in detail with reference to the accompanying drawings such that they can be easily practiced by those skilled in the art to which the described technology pertains. In this disclosure, the term "substantially" includes the meanings of completely, almost completely or to any significant degree under some applications and in accordance with those skilled in the art. The term "connected" can include an electrical connection.

As illustrated in FIG. 1, a battery pack 1 according to an embodiment includes battery modules 100, slave battery management systems (BMS') 110_1 to 110_8 connected to the battery modules 100, a master BMS 120 connected to the slave BMS' 110_1 to 110_8, and a charging/discharging switch S. Depending on embodiments, certain elements may be removed from or additional elements may be added to the battery pack 1 illustrated in FIG. 1. Furthermore, two or more elements may be combined into a single element, or a single element may be realized as multiple elements. This applies to the remaining apparatus embodiments.

The battery pack 1 can be connected to an external device (not shown) through pack terminals +P and −P, and here, the external device can be a small electronic device such as a cellular phone, a tablet computer, or a notebook computer, or can be an electric vehicle, a hybrid vehicle, and the like. Also, the external device can be a power supply unit (not shown).

The battery module 100 can include at least one battery cell such as a secondary battery, which can be charged or discharged according to consumption or supply of electric energy. For example, the secondary battery includes a nickel-cadmium battery, a lead storage battery, a nickel metal hydride (NiMH) batter, a lithium ion battery, a lithium polymer battery, and the like, and here, the secondary batteries are not limited in type.

As illustrated in FIG. 1, the number of the slave BMS' 110_1 to 110_8 can correspond to the number of battery modules 100 so as to be provided in each of the battery modules 100. The slave BMS' 110_1 to 110_8 can be electrically connected to the battery modules 100, respectively. Each of the slave BMS' 110_1 to 110_8 can control the battery modules 100 electrically connected to the slave BMS' 110_1 to 110_8.

In detail, the slave BMS' 110_1 to 110_8 can control charging or discharging, control balancing, control switching, monitoring, and the like, of the battery module 100. The slave BMS' 110_1 to 110_8 can measure state values (for example, voltages of the cells included in the battery module, an overall voltage, current, temperature, and the like) of the battery module 100 and transfer the information to the master BMS 120. Meanwhile, detailed configurations and functions of the battery modules 100 and the slave BMS' 110_1 to 110_8 corresponding thereto will be described in detail with reference to FIG. 2 hereinafter.

The master BMS 120 according to an embodiment can estimate a state of charge (SOC) and a state of health (SOH) of each battery cell or module 100. The master BMS 120 can control charging and discharging of the entire battery pack 1 with reference to the SOC or SOH value of the battery module 100 through information such as a voltage, a current, or a temperature of the battery modules 100 or battery cells transferred from the slave BMS' 110_1 to 110_8. The master BMS 120 can generate a switching control signal for turning on and off a charging and discharging switch and transfer the generated switching control signal to the charging and discharging switch.

Also, the master BMS 120 can estimate series and parallel connection relationships (e.g., how many battery modules are connected in series, how many battery modules are connected in parallel, etc.) of the battery modules by using voltage values of the battery modules 100 transferred from each of the slave BMS' 110_1 to 110_8. The method for estimating a connection relationship of the battery modules 100 by the master BMS 120 will be described in detail hereinafter.

The charging and discharging switch S can be installed between the battery modules and a positive electrode terminal P+ of the battery pack 1, and can be turned on or turned off by a control signal of the master BMS 120. The charging and discharging switch S can be a MOSFET or a relay but the described technology is not limited thereto.

Hereinafter, the detailed configurations of the battery modules 100 and the slave BMS' 110_1 to 110_8 corresponding thereto will be described in detail.

Figure 2:
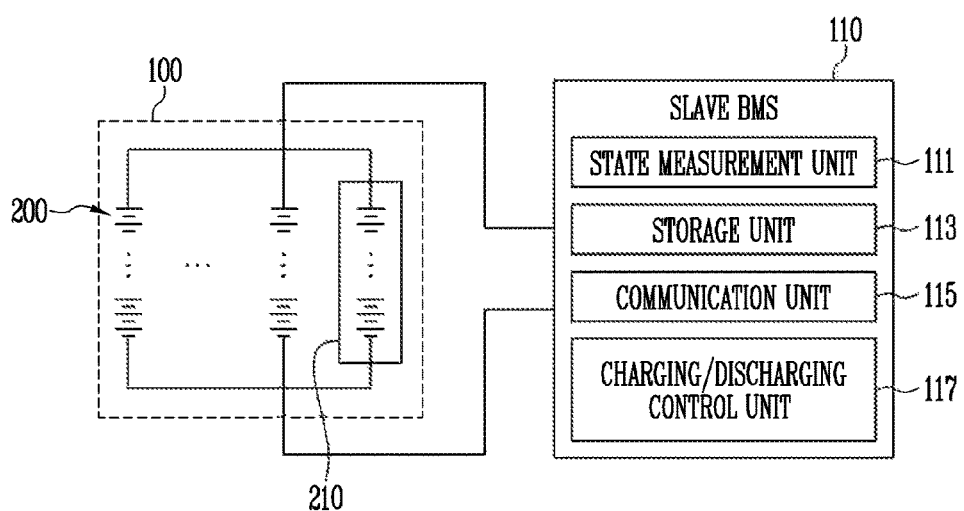
FIG. 2 is a block diagram illustrating internal configurations of a battery module and a slave battery management system (BMS) corresponding to the battery module according to an embodiment.

FIG. 2 is a block diagram illustrating internal configurations of the battery module 100 and a slave battery management system (BMS) 100_1 to 100_8 corresponding to the battery module according to an embodiment.

As illustrated in FIG. 2, the battery module 100 includes at least one battery cell 200. When a plurality of battery cells 200 are provided, the battery cells 200 are connected in series and/or parallel. In detail, A number of battery cells 200 can be connected in series, and when it is defined that the A number of battery cells 200 are a single series set 210, B number of series sets 210 can be connected in parallel.

A slave BMS 110 is electrically connected to the battery module 100 and can include a state measurement unit 111, a storage unit 113, a communication unit 115, and a charging/discharging control unit (or charging/discharging controller) 117.

First, the state measurement unit 111 can obtain information on a state value (voltage, current, temperature, etc.) of each of the battery cells 200 or battery module 100. Although not shown in FIG. 2, the state measurement unit 111 can obtain information on a temperature from a temperature sensor (not shown) attached to or installed in the vicinity of the battery module 100 to sense a temperature of the battery module 100 or an ambient temperature of the battery module 100. The temperature sensor can be, for example, a thermistor but the described technology is not limited thereto.

The state measurement unit 111 can obtain a charge current and a discharge current flowing in the battery module 100 from any one current sensor (not shown) of a hall sensor, a shunt resistor, and an equivalent thereof. The current sensor can be installed in a negative electrode terminal of the battery module 100. Also, the state measurement unit 111 can obtain a voltage of each of the battery cells 200 or a terminal voltage of the battery module 100 through a voltage sensor (not shown).

The communication unit 115 can transfer information on a state value of the battery module 100, measured by the state measurement unit 111, to the master BMS 120 or can transfer information of the battery module 100, stored in the storage unit 113, to the master BMS 120. Also, the communication unit 115 can receive a predetermined signal (for example, a charge/discharge control signal of the battery module, a state value request signal of the battery module, and the like) from the master BMS 120.

Meanwhile, the communication unit 115 can perform the master BMS 120 using a controller area network (CAN) communication network, and here, since the CAN communication network is known, a detailed description thereof will be omitted.

The storage unit 113 can store information on specifications (including data such as capacity (or power capacity), a short-circuit current, an open voltage, and a rated voltage) of the battery cells 200 or a connection relationship of the battery cells 200 (i.e., information on A and B in a case that A number of battery cells 200 connected in series are defined as a series set 210 and B number of series sets 210 are connected in parallel). Also, when the master BMS 120 calculates the SOC value and the SOH value of the battery module 100, the slave BMS 110 can obtain the calculated SOC value and the SOH value from the master BMS 120 and store the obtained values in the storage unit 113. The storage unit 113 can be a ROM, an EEPROM, a flash memory, or an equivalent memory element equivalent thereof, but the described technology is not limited thereto.

The charging/discharging control unit 117 can control charging and discharging of the battery module 100, and can control charging and discharging of the battery module 100 under the control of the master BMS 120.

Meanwhile, in FIG. 2, it is illustrated that the battery module 100 and the slave BMS 110 controlling the battery module 100 are separated, but the described technology is not limited thereto and the slave BMS 110 can be physically included in the battery module 100. Hereinafter, a method for estimating a connection relationship of the battery module 100 by the master BMS 120 to control the battery pack 1 will be described in detail with reference to FIGS. 1 through 3.

Figure 3:
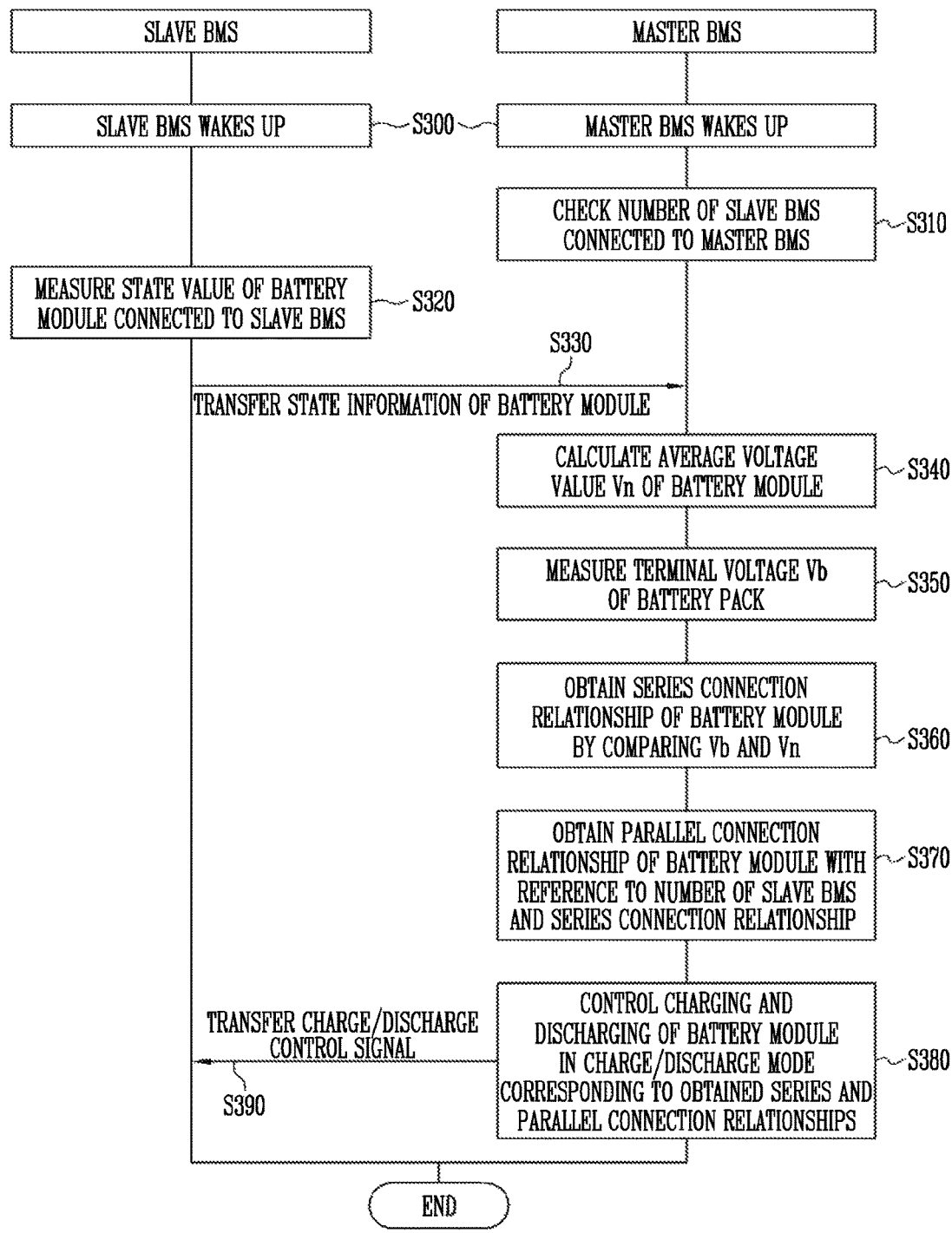
FIG. 3 is a flowchart illustrating an overall flow of a method for estimating series and parallel connection relationships of a battery module by a master battery system according to an embodiment.

FIG. 3 is a flowchart illustrating an overall flow of a method for estimating series and parallel connection relationships of a battery module 100 by the master battery system 120 according to an embodiment.

In some embodiments, the FIG. 3 procedure is implemented in a conventional programming language, such as C or C++ or another suitable programming language. The program can be stored on a computer accessible storage medium of the battery pack 1, for example, a memory (not shown) of the battery pack 1, storage unit 113, or master BMS 120. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 3. The description of this paragraph applies to the embodiments shown in FIGS. 4-5.

First, when the master BMS 120 wakes up in operation S300, the master BMS 120 checks a total number of the slave BMS' 110_1 to 110_8 connected thereto in operation S310. Here, the master BMS 120 can receive a signal from a connector connecting the master BMS 120 and the slave BMS' 110_1 to 110_8 to obtain the information on the total amount of the slave BMS' 110_1 to 110_8.

For example, when the battery module 100 is connected as illustrated in FIG. 1, the master BMS 120 can obtain information indicating that a total of eight slave BMS' 110_1 to 110_8 are connected.

Next, the master BMS 120 can obtain voltage values of the battery modules 100 from the slave BMS' 110_1 to 110_8, respectively, in operations S320 and S330. In detail, the master BMS 120 can transfer a predetermined signal requesting information on a voltage among state value information of the battery module 100 to each of the slave BMS' 110_1 to 110_8, and in response, each of the slave BMS' 110_1 to 110_8 can transfer a voltage value of the battery modules handled by each of the slave BMS' 110_1 to 110_8 to the master BMS 120.

When the voltage values of the battery modules are obtained, the master BMS 120 calculates an average voltage value Vn of the obtained voltage values in operation S340. For example, when a voltage value of the battery module B1 is about 3.0V, a voltage value of the battery module B2 is about 3.2V, a voltage value of the battery module B3 is about 3.1V, a voltage value of the battery module B4 is about 3.1V, a voltage value of the battery module B5 is about 2.9V, a voltage value of the battery module B6 is about 3.3V, a voltage value of the battery module B7 is about 3.2V, and a voltage value of the battery module B8 is about 3.0V, the master BMS 120 can calculate a value of about 3.1V as the average voltage value Vn of the battery module 100.

Next, the master BMS 120 obtains a terminal voltage Vb (voltage between B+ and B−) of the battery pack 1 in operation S350. The master BMS 120 can estimate series and parallel connection relationships of the battery modules 100 with reference to at least any one information among i) an average voltage value Vn of the battery modules, ii) a terminal voltage value Vb of the battery pack 1, and iii) a total number of the slave BMS' 110_1 to 110_8 connected to the master BMS 120.

First, the master BMS 120 can estimate a series connection relationship of the battery modules 100 with reference to the average voltage value Vn of the battery modules 100 and the terminal voltage value Vb of the battery pack 1 in operation S360.

For example, since the average voltage value Vn of the battery module 100 has been calculated, when it is assumed that the voltages of the battery modules 100 are Vn and the terminal voltage value Vb (voltage between B+ and B−) is considered to be the total voltage when the battery modules 100 are connected in series, the N value, the number of the battery modules 100 connected in series, can be estimated. That is, a value obtained by dividing the terminal voltage value Vb of the battery pack 1 by the average voltage value Vn of the battery modules 100 can be the number N of the battery modules connected in series within a serial unit set 130.

Meanwhile, when the resultant value obtained by dividing the terminal voltage value Vb of the battery pack 1 by the average voltage value Vn of the battery module 100 includes an integer and a decimal, it can be estimated that the integer value is the number N of the battery modules 100 connected in series. As described hereinafter, according to another embodiment, before obtaining the series and parallel connection relationship of the battery modules 100, voltage values of the battery modules 100 are compared, and when a voltage value is less than a predetermined value, the process of estimating series and parallel connection relationships of the batteries is performed, and thus, the decimal value can be excluded in estimating the number of the battery modules 100 connected in series.

Thereafter, the master BMS 120 can estimate a parallel connection relationship of the battery modules 100 with reference to i) the number N of the battery modules 100 connected in series, and ii) the total number of the slave BMS' 110_1 to 110_8 connected to the master BMS 120 in operation S370.

When a set of the N number of battery modules 100 connected in series is a single serial unit set 130 and the slave BMS' 110_1 to 110_8 is are connected in parallel, a parallel connection relationship of the battery modules 100 can be estimated. That is, a value obtained by dividing the total number N of the slave BMS' by the number N of the battery modules connected in series can be the number M of the serial unit set 130 connected in parallel.

The master BMS 120 can obtain the information on the series and parallel connection relationship of the battery modules 100, namely, the information indicating M the N number battery modules 100 connected in series and the M number of sets connected in parallel and can be obtained through the foregoing process, and can control charging and discharging of the battery modules 100 with reference to the obtained information on the series and parallel connection relationships in operations S380 and S390.

For example, the master BMS 120 obtains information on the series and parallel connection relationships of the battery cells provided in each battery module from the slave BMS' 110_1 to 110_8. For example, when the master BMS 120 obtains information indicating that B number of serial sets 210, of A number battery cells connected in series, are connected in parallel in each battery module, the master BMS 120 can calculate the number of battery cells connected in series or parallel in the entire battery pack 1. That is, the master BMS 120 can calculate that N×A number of battery cells are connected in series and M×B number of serial sets of the N×A number of battery cells connected in series are connected in parallel.

Thereafter, the master BMS 120 can control charging and discharging with reference to the series and parallel connection relationships of the battery cells and the specification information of the battery cells 200. The master BMS 120 can perform a protection operation to prevent an overcharge or overdischarge of the battery pack 1. For example, when a current value flowing in the battery pack exceeds a predetermined reference value, the master BMS 120 can control the charging/discharging switch to be turned off.

In the described technology, for example, when information indicating that discharging up to about 10 mA is available is included in the specification information of the battery cells 200, since the serial sets of the battery cells 200 connected in parallel in the battery pack 1 is M×B, the master BMS 120 can determine that discharging up to (M×B)×about 10 mA is available and performs an overcurrent protection operation with reference to the dischargeable current value.

Also, the master BMS 120 can calculate the capacity (or power capacity) of the battery pack 1 with reference to the series and parallel connection relationships of the battery cells 200 and the specification information of the battery cells 200. That is, the master BMS 120 can calculate a capacity value with reference to how many battery cells 200 having predetermined rate capacity as specification are connected in series or how many battery cells 200 are connected in parallel. The master BMS 120 can control charging or discharging of the battery pack 1 by using the calculated capacity value.

In order to control charging and discharging, while securing stability of the battery pack by performing the protection operation or in order to calculate capacity of the battery pack as described above, the master BMS 120 needs to recognize series and parallel connection relationships of the battery module 100 in advance. In the related art, the series and parallel connection relationships of the battery module 100 are recognized in advance from the outside of the master BMS 120 and the master BMS 120 controls the battery module 100 according to a control program designed to correspond thereto. In this case, however, the control program must be newly designed whenever the control relationships of the battery module 100 are changed.

In contrast, according to the described technology, since the master BMS 120 estimates the series and parallel connection relationships of the battery module 100, even though the series and parallel connection relationships of the battery module 100 are changed, there is no need to newly design the control program. The battery module 100 can be controlled and the capacity of the battery pack 1 can be calculated with reference to the estimated series and parallel connection relationships.

Meanwhile, although not shown in FIG. 3, before estimating the series connection relationship from the voltage values of each of the battery modules, the voltage values of the battery modules can be compared to calculate a difference value, and when the calculate difference value is equal to or greater than a preset numerical value, the charging and discharging switch can be turned off.

When the battery modules within the battery pack are erroneously connected, problems such as a degradation of stability of the battery pack, voltage imbalance, a reduction in life, and the like, occur. Thus, before estimating the series and parallel connection relationships of the battery module, it can be determined first whether battery modules having different charged states are erroneously connected and the battery pack is prevented from operating, whereby the problems can be solved.

Hereinafter, a method for controlling a battery pack according to another embodiment will be described with reference to FIGS. 4 and 5.

Figure 4:
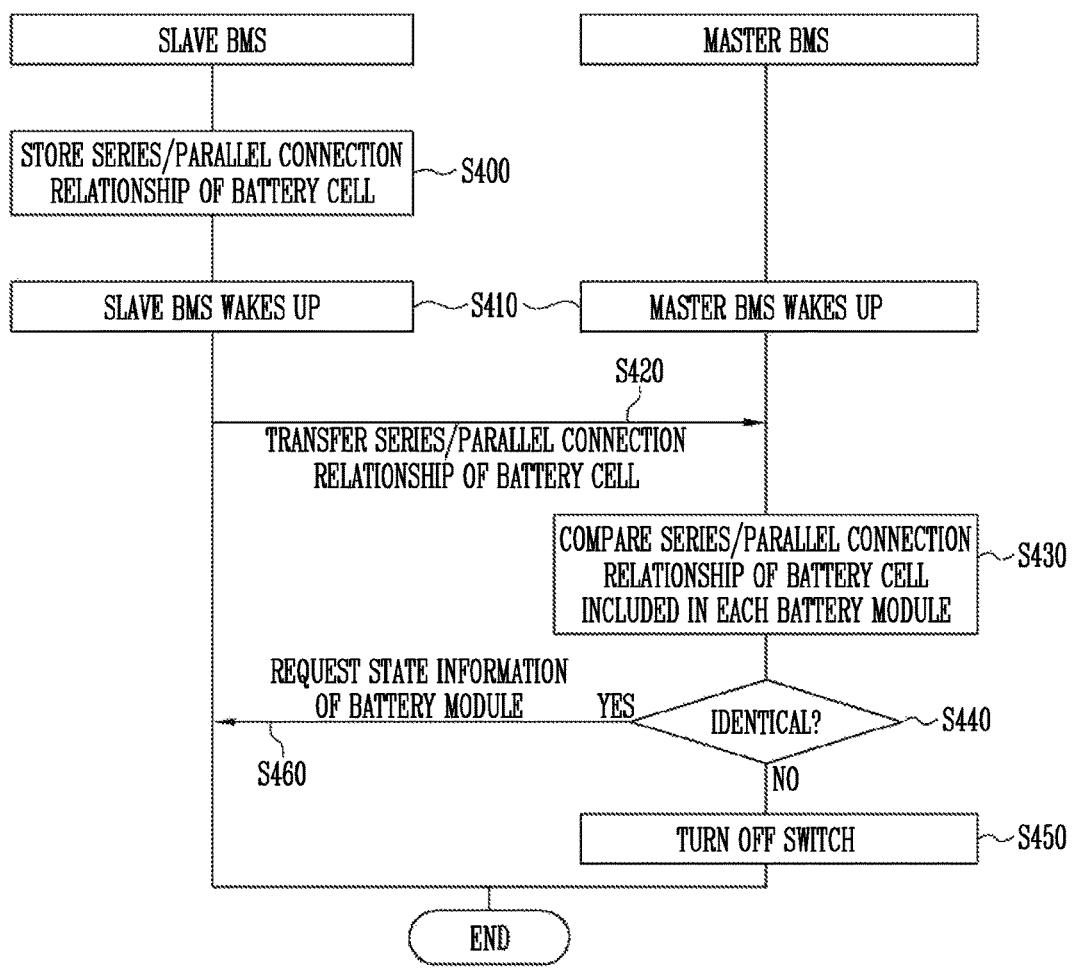
FIGS. 4 and 5 are flowcharts illustrating a partial flow of a method for estimating series and parallel connection relationships of a battery module by a master battery system according to another embodiment of the present invention.

FIG. 4 is a flowchart illustrating a partial flow of a method for estimating series and parallel connection relationships of a battery module by a master battery system according to another embodiment.

First, as described above, the information on the series and parallel connection relationships of the battery cells included in the battery module can be stored in the storage unit of each of the slave BMS' 110_1 to 110_8 in operation S400.

Next, when the master BMS 120 wakes up (when reset or when power is turned on), each of the slave BMS' 110_1 to 110_8 transfers the information on the series and parallel connection relationships of the battery cells to the master BMS 120 in operations S410 and S420. Meanwhile, the slave BMS' 110_1 to 110_8 can be woken up by a predetermined signal transmitted from the master BMS 120, and the master BMS 120 can be substantially periodically woken up by a predetermined timer.

Thereafter, the master BMS 120 can compare the series and parallel connection relationships of the battery cells included in the battery module obtained from each of the slave BMS' 110_1 to 110_8 in operation S430. When it is determined that the series and parallel connection relationships of the battery cells are different according to the comparison results, the master BMS 120 can control the charging/discharging switch S to be turned off in operations S440 and S450.

Conversely, when it is determined that the series and parallel connection relationships of the battery cells are identical based on the comparison results, the master BMS 120 can request state value information of the battery module from each of the slave BMS' 110 in operations S440 and S460. Meanwhile, although not shown in FIG. 4, when each of the slave BMS' 110_1 to 110_8 transfers the state information of the battery module, for example, the information on a voltage value to the master BMS 120 by performing the operation S460, estimating the series and parallel connection relationships of the battery module can be sequentially performed.

That is, before estimating the series and parallel connection relationships of the battery module, it is first determined whether battery modules having different voltages or capacity are erroneously connected and the battery pack is prevented from operating, whereby safety of the battery pack can be enhanced.

Figure 5:
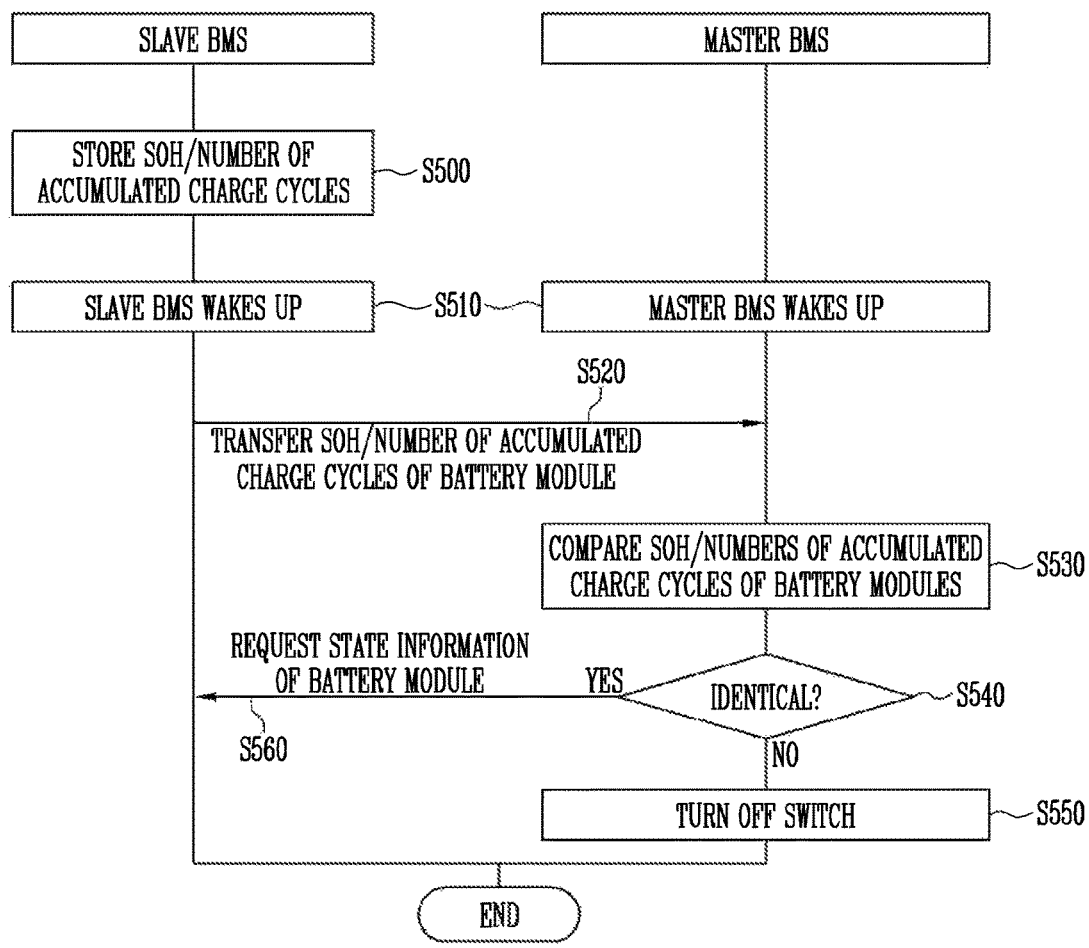

FIG. 5 is a flowchart illustrating a partial flow of a method for estimating series and parallel connection relationships of a battery module by a master battery system according to another embodiment.

First, as described above, at least one among the SOH information of the battery module and the number of accumulated charge cycles can be stored in the storage unit 113 of each of the slave BMS' 110_1 to 110_8 in operation S500. The SOH information of the battery module and the number of accumulated charge cycles stored in each of the slave BMS' 110_1 to 110_8 can be calculated by the master BMS 120 as described above. The number of accumulated charge cycles can be the number of charging and discharging performed by the battery module.

Next, when the master BMS 120 wakes up, each of the slave BMS' 110_1 to 110_8 transfers the SOH information of the battery module and the information on the number of accumulated charge cycles to the master BMS 120 in operations S510 and S520.

Thereafter, the master BMS 120 can compare the SOH information of the battery module and the information on the number of accumulated charge cycles obtained from each of the slave BMS' 110_1 to 110_8 in operation S530. When it is determined that the SOH values of the battery modules or the numbers of the accumulated charge cycles are different according to the comparison results, the master BMS 120 can control the charging/discharging switch S to be turned off in operations S540 and S550.

Conversely, when it is determined that the SOH values of the battery modules or the numbers of accumulated charge cycles are identical according to the comparison result, the master BMS 120 can request state value information of the battery modules from each of the slave BMS' 110 in operations S540 and S560. Meanwhile, although not shown in FIG. 5, when each of the slave BMS' 110_1 to 110_8 transfers the state information of the battery module, for example, the information on a voltage value to the master BMS 120 by performing the operation S560, estimating the series and parallel connection relationships of the battery module as described above can be sequentially performed.

As described above, before estimating series and parallel connection relationships of the battery module, it whether battery modules having different wear rates are erroneously connected and the battery pack is prevented from operating can be first determined, whereby safety of the battery pack can be enhanced.

The inventive technology has been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment can be used singly or in combination with features, characteristics, and/or elements described in connection with other embodiments unless otherwise specifically indicated. Accordingly, it will be understood by those of skill in the art that various changes in form and details can be made without departing from the spirit and scope of the present invention as set forth in the following claims.

What is claimed is:

1. A method for controlling a battery pack including a master battery management system (BMS) and a plurality of battery modules each including a slave BMS connected to the master BMS, the method comprising:
   first determining the number of slave BMS' electrically connected to the master BMS;
   receiving a plurality of voltage values of the battery modules from the slave BMS';
   first calculating an average value of the voltage values;
   second determining a terminal voltage of the battery pack;
   comparing the average voltage value with the terminal voltage of the battery pack to calculate the number of the battery modules connected in series; and
   third determining a first series connection relationship of the battery modules, in one of a plurality of serial unit sets, based on the comparison,
   wherein each serial unit set includes the battery modules connected in series, and wherein the method further comprises:
   after the third determining, second calculating the number of the serial unit sets electrically connected in parallel based on the number of slave BMS' electrically connected to the master BMS and the number of battery modules connected in series in the corresponding serial unit set so as to determine a first parallel connection relationship of the battery modules among the serial unit sets.

2. The method of claim 1, wherein the first determining includes:
   receiving information on second series and second parallel connection relationships of battery cells included in the battery modules from each of the slave BMS'.

3. The method of claim 2, wherein the second calculating includes calculating third series and third parallel connection relationships of all of the battery cells included in the battery pack based on the first series and first parallel connection relationships and the second series and second parallel connection relationships.

4. The method of claim 3, further comprising performing a protection operation, in the master BMS, based on the third series and third parallel connection relationships of all of the battery cells included in the battery pack.

5. The method of claim 3, further comprising third calculating a power capacity of the battery pack from the third series and third parallel connection relationships.

6. The method of claim 2, wherein the first determining further includes controlling a switch to be turned off to disable a charge current flow to the battery pack or a discharge current output from the battery pack when information on the second series and second parallel connection relationship of the battery cells included in each of the battery module are not identical.

7. The method of claim 2, wherein the first calculating includes:
   fourth calculating a difference value between the voltage values when the voltage values of the battery modules are not identical to each other; and
   controlling the switch to be turned off to disable the charge current flow to the battery pack or the discharge current output from the battery pack when the difference value is determined to be substantially equal to or greater than a predetermined value.

8. The method of claim 2, wherein the first determining further includes:
   receiving a plurality of state of health (SOH) values of the battery modules from each of the slave BMS'; and
   controlling the switch to be turned off to disable the charge current flow to the battery pack or the discharge current output from the battery pack when the SOH values are not identical to each other.

9. The method of claim 2, wherein the first determining further includes:
   receiving a number of accumulated charge cycles of each of the battery modules from each of the slave BMS'; and
   controlling the switch to be turned off to disable the charge current flow to the battery pack or the discharge current output from the battery pack when the number of accumulate charge cycles are not identical to each other.

10. A battery pack, comprising:
    a master battery management system (BMS); and
    a plurality of battery modules electrically connected to the master BMS,
    wherein each battery module includes one or more battery cells and a slave BMS,
    wherein each slave BMS is electrically connected to the master BMS, and
    wherein the master BMS is configured to determine the number of slave BMS', receive a plurality of voltage values of the battery modules from the slave BMS', calculate an average value of the voltage values, determine a terminal voltage of the battery pack, compare the average voltage value with the terminal voltage to calculate the number of the battery modules electrically connected in series in one of a serial unit, and determine a first series connection relationship of the battery modules based on the comparison,
    wherein the battery pack further comprises one or more serial unit sets each including two or more of the battery modules in the first series connection relationship,
    wherein the master BMS is further configured to calculate the number of the serial unit sets based on the number of slave BMS' electrically connected to the master BMS and the number of battery modules connected in series in the corresponding serial unit so as to determine a first parallel relationship of the battery modules among the serial unit sets.

11. The battery pack of claim 10, wherein the master BMS is further configured to receive information on second series and second parallel connection relationships of the battery cells included in the battery modules from each of the slave BMS'.

12. The battery pack of claim 11, wherein the master BMS is further configured to calculate third series and third parallel connection relationships of all of the battery cells included in the battery pack based on the first and second series and first and second parallel relationships.

13. The battery pack of claim 12, wherein the master BMS is further configured to perform a protection operation based on the third series and third parallel connection relationships of all of the battery cells included in the battery pack.

14. The battery pack of claim 12, further comprising a switch configured to be turned on or off via the master BMS so as to control current flow to the battery pack or discharge current output from the battery pack.

15. The battery pack of claim 14, wherein the master BMS is further configured to turn off the switch so as to disable the current flow to the battery pack or the discharge current output from the battery pack when the information on the second series and second parallel connection relationship of the battery cells included in each of the battery module are not identical to each other.

16. The battery pack of claim 14, wherein the master BMS is further configured to i) calculate a difference value between the voltage values when the voltage values of the battery modules are not substantially identical to each other and ii) turn off the switch so as to disable the current flow to the battery pack or the discharge current output from the battery pack when the difference value is substantially equal to or greater than a predetermined value.

17. The battery pack of claim 14, wherein the master BMS is further configured to i) receive a plurality of state of health (SOH) values of the battery modules from each of the slave BMS' and ii) turn off the switch so as to disable the current flow to the battery pack or the discharge current output from the battery pack when the SOH values are not substantially identical to each other.

18. The battery pack of claim 10, wherein each of the battery module includes one or more battery cells, and wherein each of the slave BMS' comprises:
- a state measurement unit configured to measure a state of the battery cells;
- a storage unit configured to store information of the battery cells;
- a communication unit configured to data communicate with the master BMS; and
- a charging/discharging control unit configured to control charging and discharging of the battery cells.

* * * * *